(12) United States Patent
Suerth et al.

(10) Patent No.: US 9,460,343 B2
(45) Date of Patent: Oct. 4, 2016

(54) METHOD AND SYSTEM FOR PROACTIVELY RECOGNIZING AN ACTION OF A ROAD USER

(71) Applicant: Bayerische Motoren Werke Aktiengesellschaft, Munich (DE)

(72) Inventors: Daniel Suerth, Munich (DE); Magdalena Szczot, Zorneding (DE); Joe Lallemand, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/696,903

(22) Filed: Apr. 27, 2015

(65) Prior Publication Data

US 2015/0310265 A1    Oct. 29, 2015

(30) Foreign Application Priority Data

Apr. 25, 2014   (DE) .......................... 10 2014 207 802

(51) Int. Cl.
*G06K 9/00* (2006.01)
*G06K 9/62* (2006.01)
*G06T 7/00* (2006.01)

(52) U.S. Cl.
CPC ......... *G06K 9/00382* (2013.01); *G06K 9/6202* (2013.01); *G06T 7/0044* (2013.01); *G06T 2207/30196* (2013.01); *G06T 2207/30261* (2013.01)

(58) Field of Classification Search
CPC .............. G06K 9/00382; G06K 9/00369; G06K 9/00342; G06K 9/00348; G06K 9/6202; G06T 7/0044; G06T 2207/30196; G06T 2207/30261
See application file for complete search history.

(56) References Cited

FOREIGN PATENT DOCUMENTS

| | | |
|---|---|---|
| DE | 103 53 347 A1 | 6/2005 |
| DE | 10 2013 203 239 A1 | 8/2014 |
| EP | 1 095 832 A1 | 5/2001 |
| WO | WO 2009/141092 A1 | 11/2009 |

OTHER PUBLICATIONS

Rodriguez et al., "Detecting and segmenting humans in crowded scenes", Sep. 28, 2007, ACM, Proceedings of the 15th Int. Conf. on Multimedia, p. 353-356.*
Roy et al., "On recognition of human orientatio with respect to a static camera", Mar. 26, 2013, IEEE, Int. Conf. on Emerging Trends in Computing, Communication and Nanotechnology, p. 53-57.*

(Continued)

*Primary Examiner* — Stephen R Koziol
*Assistant Examiner* — Timothy Choi
(74) *Attorney, Agent, or Firm* — Crowell & Moring LLP (57) ABSTRACT

A method and system are provided to proactively recognize an action of a road user in road traffic, wherein an image of the road user, which is structured in a pixel-wise manner, is captured by way of at least one camera, and corresponding image data is generated. Image data of multiple pixels is grouped in each case by cells, wherein the image comprises multiple cells. A respective centroid is determined based on the image data within a cell. For each of the pixels, the respective distance from the centroids of a plurality of cells is ascertained, wherein a feature vector that is assigned to the pixel is formed based on coordinates of the respective pixel and the centroids. The feature vector is compared to at least one reference vector cluster, and a pose is associated with the road user based on the comparison.

12 Claims, 5 Drawing Sheets

(56) References Cited

OTHER PUBLICATIONS

Wu et al., "Cluster Boosted Tree Classifier for Multi-View, Multi-Pose Object Detection", Oct. 21, 2007, IEEE, 11th Int. Conf. on Computer Vision, p. 1-8.*

Premebida et al., "LIDAR and Vision-based Pedestrian Detection System", Sep. 1, 2009, Wiley, Journal of Field Robotics, vol. 26, iss. 9, p. 696-711.*

German Search Report dated Mar. 12, 2015, with English translation (Twelve (12) pages).

Koehler et al., "Autonomous Evasive Maneuvers Triggered by Infrastructure-Based Detection of Pedestrian Intentions", 2013 IEEE Intelligent Vehicles Symposium (IV), Jun. 23-26, 2013, Gold Coast, Australia, (Eight (8) pages).

* cited by examiner

METHOD AND SYSTEM FOR PROACTIVELY RECOGNIZING AN ACTION OF A ROAD USER

CROSS REFERENCE TO RELATED APPLICATION

This application claims priority under 35 U.S.C. §119 from German Patent Application No. 10 2014 207 802.4, filed Apr. 25, 2014, the entire disclosure of which is herein expressly incorporated by reference.

BACKGROUND AND SUMMARY OF THE INVENTION

The invention relates to a method and to a system for proactively recognizing an action of a road user in road traffic. The invention further relates to an accordingly equipped motor vehicle.

Driver assistance systems, which warn the driver of collisions and/or in part automatically control the motor vehicle, are used with ever greater frequency in motor vehicles to avoid such collisions between motor vehicles and other road users, such as pedestrians or bicyclists who do not have corresponding safety systems to avoid collisions, or even animals. In general, appropriate sensors are provided, which are used to detect the road user by way of measurement. The driver assistance system then becomes active based on the resulting measured data.

Various sensors have already been proposed for detecting road users by way of measurement, for example optical cameras, including video cameras, radar sensors, laser beam sensors or infrared (IR) cameras.

It is particularly important to recognize the action of road users at pedestrian crosswalks, such as zebra crossings. Such areas are frequently subject to situations where an approaching motor vehicle driver is not aware that a pedestrian is planning to cross the road because the pedestrian, for example, is standing with his back to the zebra crossing, but then suddenly turns around and, without further mindfulness, crosses the road because he feels safe on the zebra crossing. Collisions may then occur between the motor vehicle and the pedestrian, even when driving carefully.

A driver assistance system for avoiding collisions of a vehicle with pedestrians is known from WO 2009/141092 A1, in which the speed of an object moving toward a pedestrian crossing is detected by way of a camera sensor and/or a beam sensor, such as a millimeter wave radar, and the probability with which the object will cross the pedestrian crossing is determined. A warning is issued to the driver when a predefined probability threshold is exceeded.

A system for avoiding collisions between a vehicle and pedestrians is also known from EP 1 095 832 A1, in which pedestrian data is detected by way of measurement, as is additional data, such as regarding the roadway surface. A warning is optionally issued to the driver and/or control interventions in the vehicle control are carried out, such as automatic braking, based on processing of the data.

The content of the above-mentioned publications is hereby incorporated as non-essential matter herein.

It is the object of the invention to make a contribution toward the ability of avoiding collisions between a motor vehicle and other road users.

This and other objects are achieved according to the invention by providing a method and system for proactive recognition of an action of a road user in road traffic. For this purpose, an image of the road user, which is structured in a pixel-wise manner, is captured by way of at least one camera, and corresponding image data is generated; image data of multiple pixels is grouped in each case by cells, wherein the image comprises multiple cells; a respective centroid is determined based on the image data within a cell; for each of the pixels, the distance from the centroids of a plurality of cells is ascertained, wherein a feature vector that is associated with the pixel is formed based on coordinates of the respective pixel and the centroids; and the feature vector is compared to at least one reference vector cluster, and a pose is associated with the road user based on the comparison, the pose being representative of the road user planning to carry out the action.

The feature vector in particular has as many dimensions as cells of the image are provided.

A road user can, in particular, be a pedestrian, an animal, a bicyclist, a wheelchair user or another motor vehicle driver, including a motorcyclist. An action of the road user can, in particular, be a crossing of the roadway. By way of the pose recognized according to the invention, it can advantageously be achieved that the corresponding intention of the road user is already recognized before the action begins, for example a crossing intention. The invention is based on the finding that the intention of a road user can be recognized based on poses even before the actual action is carried out, which is to say that it is possible, based on the correct association of a pose of the road user, to proactively recognize that the user will carry out a certain action. Based on this pose recognition, it is then likewise possible to proactively take measures even before the action occurs, for example an acoustic and/or visual warning can be issued to the driver and/or to the road user detected by way of measurement, and/or a controlling intervention in a vehicle system can take place, for example in the brakes or in the steering.

Within the scope of the pose recognition, it is also possible to recognize or associate a sequence of poses, movements and/or partial movements of the road user. For example, the poses or partial movements of the individual extremities of the pedestrian can be determined by the camera of the vehicle and associated already in the region of the curb, even before the actual crossing of a pedestrian crossing by a pedestrian. In particular, the orientation of the pedestrian with respect to the camera and/or the direction of movement of the pedestrian can be detected. It is also possible to detect a group of road users and carry out the corresponding associations for the road users with respect to their potential intention to carry out a corresponding action. For example, it is possible to detect parameters such as poses and directions and speeds of partial movements of the individual extremities of potential pedestrians who intend to cross the road within a future time period. If the system ascertains that a pedestrian plans to cross the road, a warning can be issued to the driver of the motor vehicle, for example, the braking action during braking can be boosted and/or a direct intervention in the braking system can be carried out. Time data, such as a respective start, a duration and/or an end of a time period, at which it is to be expected that the road user detected by way of measurement will carry out the action, can be associated with a pose or multiple consecutive poses. Based on the corresponding time data, further processes, in particular control processes, can be initiated and/or controlled in the motor vehicle for collision avoidance.

A system according to the invention can in particular be a driver assistance system or be integrated therein. It can in particular be provided in a motor vehicle.

It is also advantageously possible to achieve by way of the invention that a correct association of a pose of the road user is already possible using a camera having a relatively low resolution of just a few 10,000 or 100,000 pixels, for example.

On the other hand, it is possible to achieve in this way that the image processing step can be carried out at high speed, and in particular in real time. In this way, effective collision protection can advantageously be achieved for the road users. The image signals can additionally have a high noise component without significantly impairing the detection quality. In this way, the action or the corresponding intention of the road user can be reliably proactively recognized even under unfavorable lighting and/or weather conditions.

In one preferred exemplary embodiment of the invention, the image data captured by the camera is filtered for the determination of the respective cell centroid to the effect that data of a contiguous image area, referred to as foreground image data, is created, wherein the road user is depicted in the image area and at least some of the other image components captured by the camera are filtered out. The cells comprise the contiguous image area of the road user, wherein in particular each of the cells or only a small portion of less than 10% of the cells, for example, comprises at least one pixel of the contiguous image area.

In a further preferred exemplary embodiment of the invention, a respective pixel-wise orientation of the road user relative to the camera is associated in the course of the comparison of the respective feature vectors of the respective pixels to the respective at least one reference vector cluster. Based on the pixel-wise associations, an orientation of the road user is associated. Overall, the ultimate association of the orientation of the road user can, in particular, take place based on a multitude of pixel-wise associations.

In a further preferred exemplary embodiment of the invention, the feature vectors are compared pixel-wise to the respective reference vector clusters and/or further reference vector clusters, which are classified according to possible poses of the road user, and in particular according to the associated orientation based on the associated orientation. The pose is then associated by way of the result of the comparison. The orientation and pose can also be associated in one step, for example by combining the two described steps for associating the orientation and the pose into one step. The two respective reference vector clusters can accordingly be summarized or combined for this purpose in a combined reference vector cluster.

The invention can advantageously be used to provide a two-stage or two-part process in the association of the pose of the road user in such a way that, on the one hand, or first, an association of the orientation of the road user relative to the camera is carried out, in particular from a predefined number of orientations and in particular in two directions as to whether the road user faces away from the camera or faces the same. On the other hand, or thereafter, the association of the pose of the road user is carried out, in particular based on the first association of the orientation, and in particular from a predefined number of poses.

Such a two-part or two-stage process in the association of the pose allows a high association accuracy of the pose to be achieved since the image data for the association of a pose can be evaluated significantly more easily when the orientation of the road user has already been determined.

According to a further preferred exemplary embodiment of the invention, the comparison of the feature vectors to the reference vector clusters is carried out by way of a random forest method. In such a classification method, decision trees that have been constructed in a certain kind of randomized process and comprise the reference vector clusters are used in particular in a learning process. The reference vector clusters can each be associated with an orientation of the road user relative to the camera and/or a pose of the road user.

So as to proactively recognize the action of the road user, advantageously further data can be captured and used, in particular surroundings data, such as data regarding a traffic light, a traffic sign or a zebra crossing; geographic data, such as position data determined by a global positioning system (GPS); map data from a navigation system and/or road images from a two- or three-dimensional map. It is also possible to use measured data regarding the road user, such as data from a LIDAR measuring device, an ultrasonic measuring device or an IR measuring device, and/or data of the motor vehicle, such as the speed thereof.

The invention can be employed for a plurality of traffic situations, for example for crossing a zebra crossing by pedestrians or for the detection of children playing between cars who suddenly cross the road.

A stereo camera system having two cameras can advantageously be used for the invention. In this way, three-dimensional images of the road user can be recorded and used, and the recognition reliability can be increased yet again. The pixels and the respective feature vectors thereof are then likewise configured according to these three spatial dimensions.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
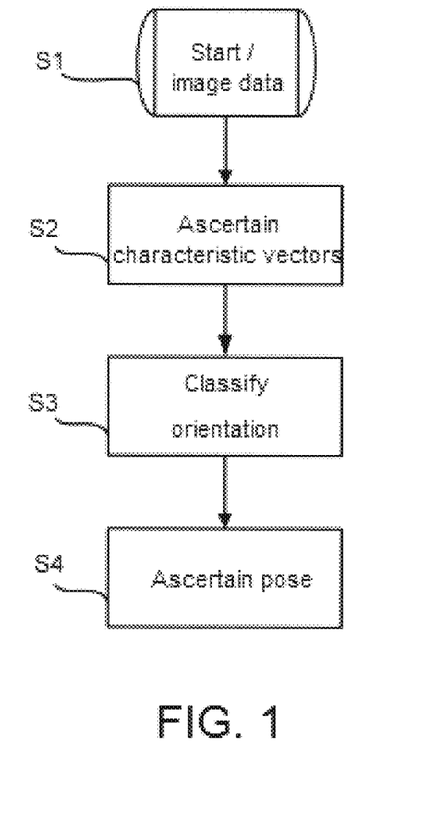
FIG. 1 is a flow chart for ascertaining a pose.

FIG. 1 is a high level flow chart of the steps for ascertaining a pose of a road user, for example of a pedestrian, in road traffic. In the starting step S1, image data of a corresponding traffic situation is made available, for example by a camera system that is provided on a motor vehicle. The image or the image data is structured in a pixel-wise manner. For this purpose, the camera system can include one or more cameras, for example, each having a charge coupled device (CCD) chip having a spatial resolution of 1176×640 pixels, for example, and a color and/or brightness resolution of 2 bytes per pixel. However other, in particular higher, resolutions are also possible in each case.

If a stereo camera is used, corresponding image processing algorithms can be provided so as to obtain distance and/or depth information about the particular depicted objects from the stereo images.

In step S2, characteristic vectors are ascertained in a pixel-wise manner. In step S3, the orientation of the image is classified. And, in step S4, the pose of the pedestrian is ascertained.

Figure 2:
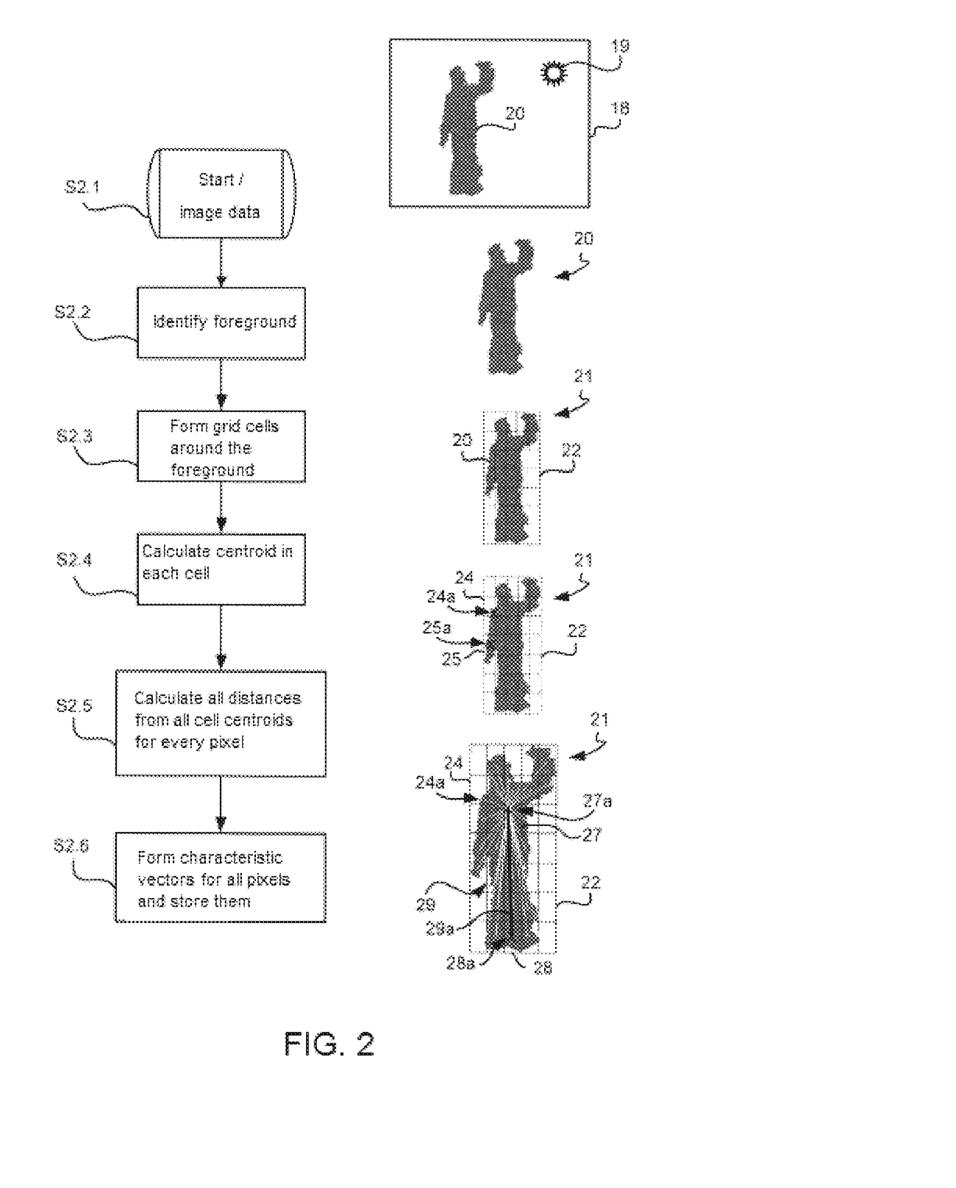
FIG. 2 is a flow chart having pictorial explanations for forming characteristic vectors for pixels.

The flow chart shown in FIG. 2 shows detailed method steps of the higher-level step S2 provided in FIG. 1. Images are shown in each case to the right of the corresponding method steps, which illustrate the effect of the corresponding method steps. The method steps can in particular be carried out entirely or partially by way of a computer program that is loaded onto and executed in a vehicle-internal computer system. In step S2.1, the image data of an image 18 structured in a pixel-wise manner is read in, for example by a computer program into a computer memory. The image 18 includes a depiction 20 of a pedestrian and further image elements, such as the sun 19 in the background.

In step S2.2, a foreground 20, in which the depiction of the pedestrian is located, is identified in a program-controlled manner by processing of the image data within the image 18. For example, the image area of the pedestrian in the form of a contiguous region can be recognized as the foreground. In step S2.3, a grid 22 having n×m cells (n, m being natural numbers) is generated around the foreground 20 in an image area 21, wherein optionally first, in an intermediate step, a rectangle can be placed closely around the identified foreground 20. This type of division can advantageously be designed to be scale-invariant when the total size of the rectangle, regardless of the actual size of the same, is divided into a predefined, in each case identical number of cells, or when the grid has a predefined, in each case identical number of cells. The pose that is thus ultimately determined in an identification process is consequently invariant to the actual size of the respective detected road users, such as pedestrians.

In the example of FIG. 2, the grid 22 comprises 5×7 cells. Each of the cells can comprise 10×15 pixels, for example. In step S2.4, the respective pixel centroid is then calculated for each of the cells of the grid 22, and the respective calculated coordinates of the centroids are stored. In the image area 21 shown, the centroid 24a results are for cell 24, and the centroid 25a results are for cell 25. The cell structure thus ascertained represents very simple coding in the shape of the detected road user.

In step S2.5, the respective distances from all centroids of the cells 24, 25 and the like are calculated for each of the pixels of the foreground 20. In the shown image area 21, for example, a line segment 29a to the centroid 28a of the cell 28 results for the pixel 27a of the cell 27. Accordingly, a plurality of distances or corresponding line segments results for pixel 27 for all cells of the grid 22, which is indicated in the image example as section family 29. In step S2.6, a characteristic vector of the respective pixel is calculated from the plurality of distances in a pixel-wise manner for each of the pixels 27 etc. of the foreground 20 and is stored. While a two-dimensional image is assumed in FIG. 2, it is clear that the described method steps can also be applied accordingly to three-dimensional image data, in particular from a stereo camera system. The characteristic vector thus determined in a pixel-wise manner can particularly advantageously be determined for stereo images that have a relatively high noise component.

Figure 3:
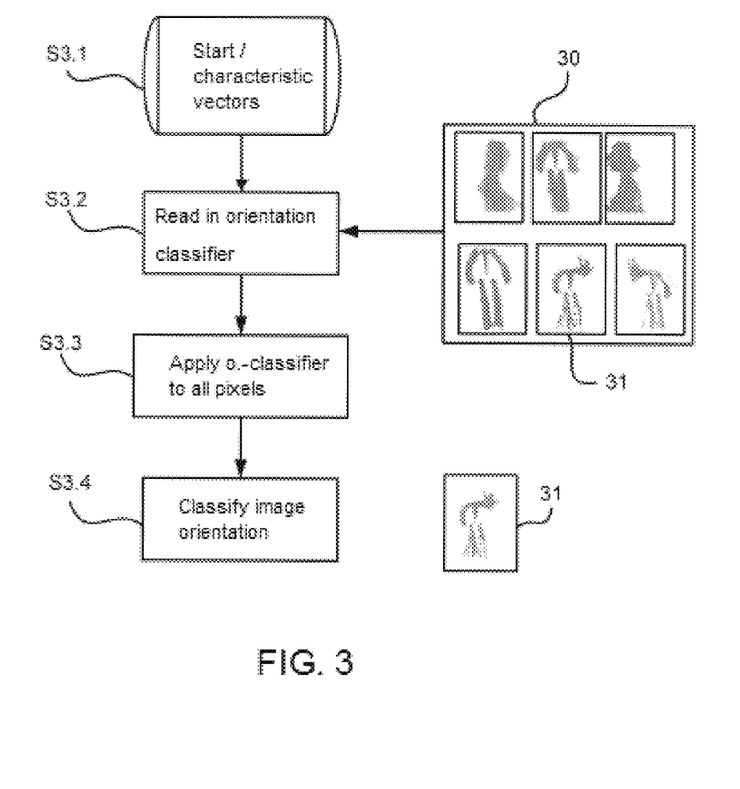
FIG. 3 is a flow chart having pictorial explanations for classifying an image orientation.

The flow chart shown in FIG. 3 shows detailed method steps of the higher-level step S3 provided in FIG. 1. Images are shown to the right of the method steps S3.2 and S3.4, which illustrate corresponding data. The method steps can in particular be carried out entirely or partially by way of a computer program. In the starting step S3.1, the characteristic vectors formed in step S2.6 are read in for all pixels. Classification data 30 is read in step S3.2, which was obtained in empirical experiments, for example, and provides orientation clusters for the image orientation in each case for particular characteristic vectors. In the empirical experiments for forming the classification data 30, for example, test individuals can assume various predefined poses in a certain orientation with respect to a recording camera, wherein the respective characteristic cluster data is ascertained. It is possible to provide n orientations, where n is a natural number>1. For example, two orientations can be provided for "recording from the front" and "recording from the back." The thus formed classification data can then be broken down into clusters, for example into a frontal cluster, which includes all poses and the corresponding characteristic vectors thereof, which were recorded for the orientation "recording from the front," and a back cluster, which includes all poses and the corresponding characteristic cluster data thereof, which were recorded for the orientation "recording from the back." So as to form the corresponding characteristic cluster data, the angles between neighboring intersecting points can be calculated in each case for the poses. The clusters can be formed in an automated manner by applying a k-means algorithm to the shared angles. A k-means algorithm is a method for vector quantization which is known per se. A previously known number of k groups is formed from a number of like objects, where k is a natural number.

The k-means algorithm is advantageously not applied to Euclidian distances of shared positions in the 2D or 3D space. The algorithm thus does not separate according to individuals of varying sizes, but only according to poses. By using only shared angles and appropriately disregarding the lengths of extremities, consistent clusters can be generated for different poses with respect to the overall orientation of a person, regardless of the size of the person.

So as to generate a random forest for the classification, it can advantageously be provided that each pixel is classified into a correct cluster in step 3.3. In the pixel-wise application of the random forest to the respective characteristic vector of the pixel, it is then possible to associate the orientation of the depicted object or road user relative to the camera with high probability. FIG. 3 shows several images of clusters in the cluster data 30 by way of example, wherein the cluster 31 is associated in step S3.4.

Figure 4:
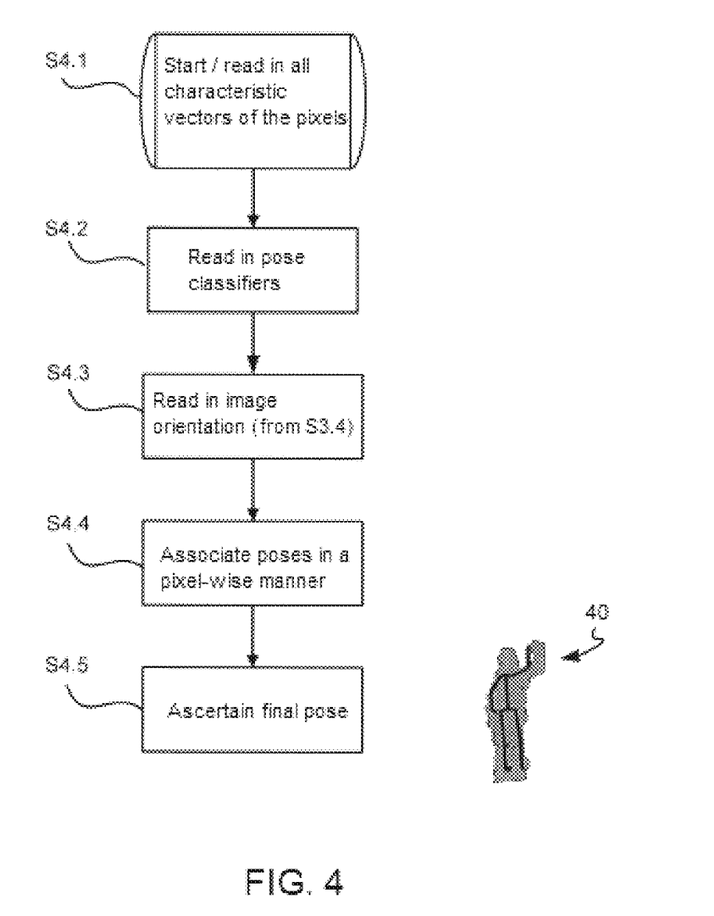
FIG. 4 is a flow chart having a pictorial explanation for ascertaining a pose based on characteristic pixel vectors.

The flow chart shown in FIG. 4 shows detailed method steps of the higher-level step S4 provided in FIG. 1. In the starting step S4.1, all characteristic vectors of the pixels are read in. In step S4.2, predefined classification data on poses of different orientation clusters are read in, the data having previously been appropriately trained.

In step S4.3, the image orientation previously ascertained in step S3.4, or the orientation cluster associated with this image orientation, is read in. In step S4.4, poses are associated in a pixel-wise manner for each pixel based on the read-in pose classification data within the predefined or read-in orientation clusters based on the characteristic vector. Based on the respective associated poses of all pixels, a final pose 40 is ascertained in step S4.5, for example based on a simple majority decision across all pixels. The final associated pose 40 is in particular a pose from a predefined number of poses, each of which is associated with a skeleton-like, simplified schematic illustration of the road user, such as pedestrian. The pose, in turn, can be associated with an expected action of the road user, based on which a traffic situation can be evaluated, a potential hazard can be inferred or optionally further control measures can be initiated in an entirely or partially automatic manner. For example, a partially bent-over pose, in which a person typically begins to run, can be associated with a hazard in road traffic when the pose is detected in an orientation "from the front," which is to say that the person is moving toward the vehicle.

The pose classification data can advantageously be ascertained and provided as regression data for a group of random forests (regression forests). Training data sets are used to form or train the classification data of a random forest, the training data sets in each case belonging to a random selection of training images which, in turn, belong to a predefined cluster. The training images can, in particular, be provided by a camera having a higher image resolution than the image resolution of the cameras which are used to carry out the pose association in steps S4 and S4.4. A simplified structure image of the particular actual pose can be provided for or associated with each training image, which is known as a ground truth skeleton.

Figure 5:
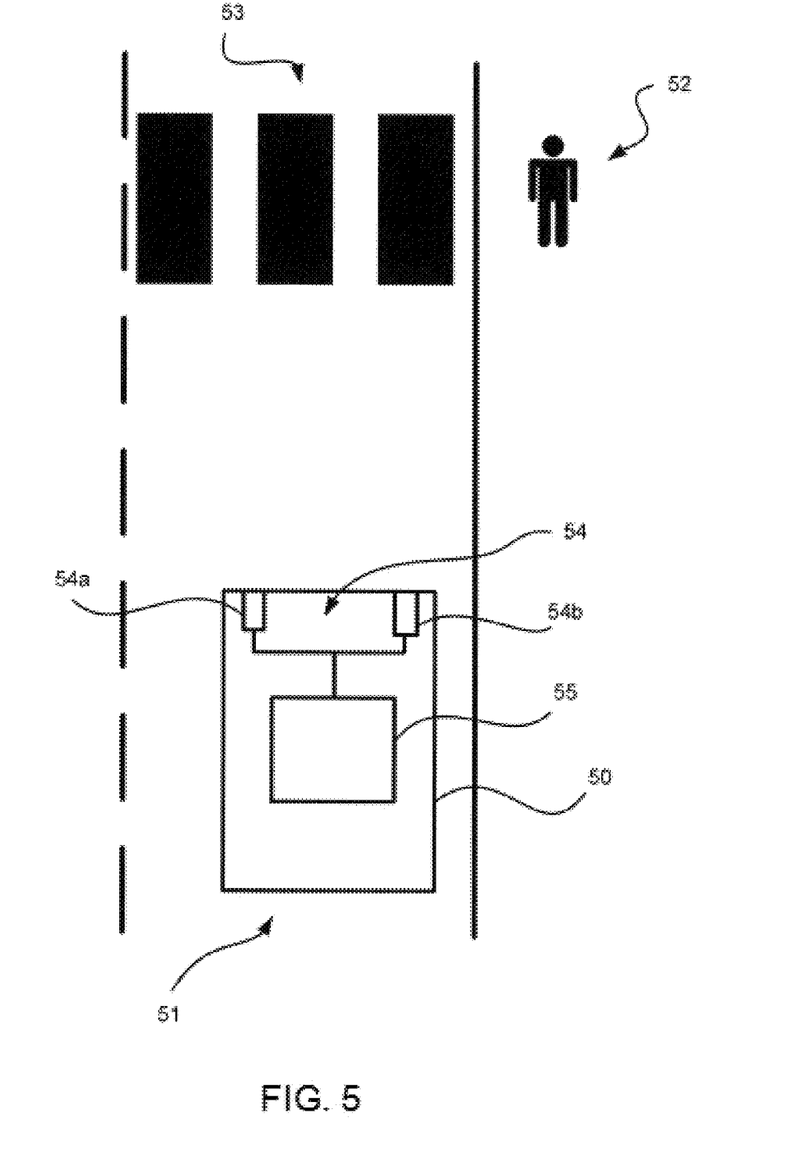
FIG. 5 illustrates a traffic situation on a zebra crossing.

FIG. 5 shows a traffic situation in which a motor vehicle 50 is moving toward a zebra crossing 53 on a road 51. A pedestrian 52, for whom it is to be ascertained whether he or she will cross the zebra crossing 53 on the road 51, is located at the roadside. Provided for this purpose in the motor vehicle 50 is camera system 54 including a first camera 54a and a second camera 54b, which capture the traffic area in front of the motor vehicle 50, including the zebra crossing 53 and the area on the roadside where the pedestrian 52 is located. Each of the cameras 54a, 54b captures a two-dimensional image and forms corresponding image data. The image data captured by the camera system 54 is supplied to a control and image processing unit 55 of the motor vehicle 50, which processes the data in accordance with the above-described method steps and optionally sets additional processes in motion in the vehicle, so that, for example, a warning can be issued to the vehicle driver and/or an automatic intervention in vehicle control components, such as the braking system, can be carried out when a hazard is associated with the detected pose.

The described devices and systems are in particular controlled by computer programs, which entirely or partially carry out the corresponding method steps, and can comprise further elements of computers and digital control devices, such as a microprocessor, volatile and non-volatile memories, interfaces, and the like, which are known per se. The invention can therefore also be entirely or partially be implemented in the form of a computer program product, which entirely or partially brings about a procedure according to the invention when loaded onto and executed on a computer. It can be provided in the form of a data carrier, such as a CD/DVD, for example, or in the form of one or more files on a server, from which the computer program can be downloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for proactively recognizing an action of a road user in road traffic, the method comprising the acts of:
capturing an image of the road user, which is structured in a pixel-wise manner, by way of at least one camera, and generating corresponding image data;
grouping pixels from the image data into a corresponding plurality of cells, wherein the image comprises the plurality of cells;
determining a respective cell centroid based on the image data for each of the plurality of cells;
for each of the pixels, determining a distance from the cell centroids of the plurality of cells, wherein a feature vector is assigned to each pixel based on coordinates of the respective pixel and the cell centroids; and
comparing the feature vector for each of the pixels to at least one reference vector cluster;
associating a pose, from a predetermined number of poses, with the road user based on said comparing; and
determining an expected action of the road user based at least in part on the associated pose.

2. The method according to claim 1, wherein for determining the respective cell centroid, the method further comprises the acts of:
filtering the image data captured by the camera to the effect that data of a contiguous image area is created, wherein the road user is depicted in the image area and at least some of the other image components captured by the camera are filtered out; and
wherein the plurality of cells comprise the contiguous image area, and further wherein each of the plurality of cells comprises at least one pixel of the contiguous area.

3. The method according to claim 2, wherein a respective pixel-wise orientation of the road user relative to the camera is associated in the course of the comparison of the respective feature vectors of the respective pixels to the respective at least one reference vector cluster and, based on the associated respective pixel-wise orientation, an orientation of the road user is associated.

4. The method according to claim 3, wherein, based on the associated orientation, the feature vectors are compared pixel-wise to the respective reference vector clusters thereof and/or further reference vector clusters, which are classified according to possible poses of the road user, and in particular according to the associated orientation, and the pose is associated by way of the result of the comparison.

5. The method according to claim 1, wherein the comparison of the feature vectors to the reference vector clusters is carried out by way of a random forest method, wherein decision trees constructed during a learning process are used, which comprise the reference vector clusters.

6. The method according to claim 1, wherein further data is detected and used to proactively recognize the action of the road user, such further data comprising surroundings data, geographic data, measurement data regarding the road user and/or data of the motor vehicle.

7. The method according to claim 1, wherein a stereo camera system is provided, which comprises first and second cameras, wherein the image of the road user is captured three-dimensionally using image data.

8. A system for proactively recognizing an action of a road user in road traffic, comprising:
at least one camera, which is usable to capture an image of the road user that is structured in a pixel-wise manner, and which generates corresponding image data; and
a data processing system configured to:
group pixels from the image data into a corresponding plurality of cells, wherein the image comprises the plurality of cells;
determine a respective cell centroid based on the image data for each of the plurality of cells;
ascertain, for each of the pixels, the respective distance from the cell centroids of the plurality of cells, wherein a feature vector is assigned to each pixel based on coordinates of the respective pixel and the cell centroids; and compare the feature vector for each of the pixels to at least one reference vector cluster;

associate a pose, from a predetermined number of poses, with the road user based on the comparison; and determine an expected action of the road user based at least in part on the associated pose.

9. The method of claim 1, further comprising issuing a warning to a vehicle driver in response to the determined expected action of the road user.

10. The method of claim 1, further comprising associating poses, from the predetermined number of poses, with the road user for each of the pixels comprising the image data, wherein the method further comprises determining a final pose based on the associated poses for each of the pixels, and wherein determining the expected action comprises determining the expected action of the road user based at least in part on the final pose.

11. The system of claim 8, wherein the data processing system is further configured to issue a warning to a vehicle driver in response to the determined expected action of the road user.

12. The system of claim 8, wherein the data processing system is further configured to:

associate poses, from the predetermined number of poses, with the road user for each of the pixels comprising the image data, determine a final pose based on the associated poses for each of the pixels, and determine the expected action based at least in part on the final pose.

\* \* \* \* \*